United States Patent
Bouchat et al.

(10) Patent No.: US 8,126,000 B2
(45) Date of Patent: Feb. 28, 2012

(54) METHOD, DEVICE AND MODULE FOR OPTIMISING THE REMOTE MANAGEMENT OF HOME NETWORK DEVICES

(75) Inventors: Christele Bouchat, Antwerp (BE); Pascal Marie Edouard Julien Justen, Sint-Pieters-Woluwe (BE); Tom Van Leeuwen, Ghent (BE)

(73) Assignee: Alcatel Lucent, Paris (FR)

( * ) Notice: Subject to any disclaimer, the term of this patent is extended or adjusted under 35 U.S.C. 154(b) by 103 days.

(21) Appl. No.: 12/461,316

(22) Filed: Aug. 7, 2009

(65) Prior Publication Data
US 2010/0054266 A1    Mar. 4, 2010

(30) Foreign Application Priority Data
Sep. 1, 2008   (EP) .................................... 08290819

(51) Int. Cl.
*H04L 12/28* (2006.01)
*H04L 12/56* (2006.01)
(52) U.S. Cl. ...................................................... 370/401
(58) Field of Classification Search .................... 370/401
See application file for complete search history.

(56) References Cited

U.S. PATENT DOCUMENTS
| | | |
|---|---|---|
| 7,249,377 B1 | 7/2007 | Lita et al. |
| 7,543,146 B1 * | 6/2009 | Karandikar et al. .......... 713/175 |
| 2004/0049714 A1 | 3/2004 | Marples et al. |

FOREIGN PATENT DOCUMENTS
EP    1 667 359    6/2006

OTHER PUBLICATIONS
"TraceSpan Announces TR-069 Support and Analysis" Internet Article, Nov. 19, 2007, pp. 1-1, XP002512208.
"Home Gateway Technical Requirements: Residential Profile", Internet Article, Apr. 29, 2008, pp. 1-125, XP002512209.

* cited by examiner

*Primary Examiner* — Ayaz Sheikh
*Assistant Examiner* — Tarell Hampton
(74) *Attorney, Agent, or Firm* — Harness, Dickey & Pierce, P.L.C.

(57) ABSTRACT

A method is disclosed for managing a home network which is connected by means of a home network gateway device to an external network, the home network comprising at least a first TR-069 compatible device and the external network having at least one auto configuration server (ACS) adapted and arranged for allowing automatic configuration of the TR-069 compatible device, characterized in that it comprises monitoring TR-069 sessions between the at least one TR-069 compatible device and the at least one ACS, in the home network gateway device.

2 Claims, 4 Drawing Sheets

METHOD, DEVICE AND MODULE FOR OPTIMISING THE REMOTE MANAGEMENT OF HOME NETWORK DEVICES

TECHNICAL FIELD OF THE INVENTION

The present invention relates to the field of methods, devices and modules for optimising the remote management of home network devices.

BACKGROUND OF THE INVENTION

The Broadband Forum is an international industry consortium of service providers, equipment and component manufacturers and other interested parties, focussing on developing broadband communications. The broadband Forum develops technical specifications and indirectly standards that enable delivery of broadband products and services. More information about the broadband Forum is available from its internet site http://www.broadband-forum.org/

One of those technical specifications is the Broadband forum's Technical report TR-069 (e.g. issue 1, amendment 2, dating from December 2007 [also referred to as version v1.1 for the purpose of this description]), specifying the CPE WAN Management Protocol (also referred to as CWMP or TR-069). The TR-069 Management Protocol and corresponding network architectures allow communication between a Customer Premises Equipment (CPE) and an automatic configuration server (ACS). It defines a mechanism that encompasses secure auto-configuration of a CPE by means of an automatic configuration server (ACS), which is typically located at the operator side, and also incorporates other CPE management functions into a common framework.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

For the purpose of the present invention, the following terminology has been used, corresponding, unless mentioned otherwise, with the terminology of the TR-069 specification. The term "Device" is used in its ordinary sense and not as in TR-069. The CPE in the TR-069 specification can thus be seen as an example of a device for the purpose of the present description.

ACS: Auto-Configuration Server: this is a means for automatically configuring a Customer Premises Equipment, e.g. a component in the broadband network responsible for auto-configuration of the CPE using the TR-069 protocol for advanced services. The ACS can also be used for lifecycle management of the services deployed on the CPE (It is to be noted that a collection of ACS's behind a load balancer is considered a single ACS for the purposes of this description).

CPE Customer Premises Equipment; an example of a device present at the customer premises. It preferably refers to any TR-069-compliant (or CWMP compliant) device. Examples of customer premises equipments are Set Top Boxes, internet/service gateway devices and LAN-side end devices, wireless sensor gateways, modems and telephones.

CWMP: CPE WAN Management Protocol (the subject of the standard TR-069). It is to be noted that the internet gateway device (IGD) object model has further been defined in TR-098 of the Broadband Forum.

RPC: Remote Procedure Call.

Session: a contiguous sequence of remote management protocol (RMP), e.g. CWMP) transactions between a device (e.g. CPE) and an automatic configuration means (e.g. ACS).

It is though to be noted that the terminology may be applicable in a wider context than the specific TR-069 context.

In the state of the art, the TR-069 compliant devices have a direction connection with the automatic configuration server, typically in the operator's network. The information transferred between the client premises equipment (CPE) and the automatic configuration server (ACS) is invisible to other, intermediate devices. This means that the knowledge of the TR-069 devices and network configuration of the whole network can only be built-up in the ACS (automatic configuration server), while this information is not available locally in a home network. This means that the running of diagnostics tools for the home network is not efficient and easily scalable.

This means also that the automatic configuration server (ACS) has to establish a TR-069 session for every TR-069 device present in the home network. The automatic configuration server may hereby be overloaded by diagnostics related notifications coming from the TR-069 devices.

The automatic configuration server may also not have enough information about the home network topology in order to be able to optimize the network. Indeed, the automatic configuration server will know about the TR-069 devices and their interfaces, but it has no knowledge on how those interfaces are interconnected in the home network. Moreover, the autoconfiguration server has no knowledge about configuration and interconnections of non TR-069 devices in the home network.

This means also that when links go down in the home network, notifications can be sent to the automatic configuration server, possibly overloading the automatic configuration server. Database entries in the automatic configuration server may moreover not be deleted in the ACS database, which may result in a wrong remote view of the home network topology. This means that the network devices configuration may not be efficient or optimal.

It is an object of the present invention to provide a method for managing a home network, a gateway device and a network analysis module, which are solving at least one of the above problems.

This is achieved by the characterizing features of at least one example embodiment.

According to a first aspect of the present invention, the method as disclosed for managing a home network which is connected by means of a home network gateway device to an external network, the home network comprising at least a first TR-069 compatible device and the external network having at least one automatic configuration server adapted and arranged for allowing automatic configuration of the TR-069 compatible device, further comprising monitoring TR-069 sessions between the at least one TR-069 compatible device and the at least one automatic configuration server. This is preferably performed in the home network gateway device (or gateway).

According to preferred embodiments all or at least a substantial portion of the TR-069 sessions established by home network devices are passing through said home network gateway device. In another view, the gateway is preferably arranged such that all or at least a substantial portion of the TR-069 sessions for home network TR-069 enabled devices are passing through it.

According to embodiments of the present invention the monitoring comprises interpreting and if necessary decoding the TR-069 sessions (messages) (or at least part of the TR-069 sessions (messages)), in order to retrieve configuration information for the TR-069 enabled device or devices.

In order to monitor the information contained in the TR-069 sessions, the gateway may need to decrypt information, when the TR-069 session is encrypted. TR-069 session can be encrypted by SSL or TLS. In order for the gateway to decrypt the SSL session, one could use state of the art techniques as for instance the method described in U.S. Pat. No. 7,249,377, which is hereby incorporated by reference.

According to preferred embodiments of the present invention the method further comprises retrieving home network configuration information for non-TR-069 enabled devices, preferably by the gateway. This information may be retrieved by means of state of the art techniques and tools. This may occur for instance by using Ping™, Traceroute™, or other state of the art diagnostics tools.

According to preferred embodiments of the present invention the method further comprises retrieving or deriving home network configuration information based on the configuration information of the TR-069 enabled device or devices.

According to preferred embodiments of the present invention the retrieving or deriving of the home network configuration information may further be based on configuration information of non-TR-069 enabled devices in the home network. By retrieving and deriving home network configuration information, the method allows to build an overview of the home network. This overview and/or home network configuration information may also be outputted towards a human machine interface device as for instance a computer terminal comprising a screen and/or information inputting device.

According to preferred embodiments of the present invention the device(s) configuration information and home network configuration information can be stored in a network configuration storage means. This network configuration storage means may be integrated in a gateway device. The gateway device may further comprise a modem (as for instance a DSL-modem).

The method according to preferred embodiments of the present invention may further comprise the set-up of a TR-069 session between the home network gateway device and a second automatic configuration server in order to instruct a reconfiguration of a second TR-069 compatible device present in the home network by the second ACS, based on the device(s) configuration information and the home network configuration information, in order to optimize the home network configuration. It is to be noted that the gateway itself is a TR-069 enabled device as it is provided with a TR-069 client and is manageable by an ACS.

The first TR-069 compatible device and the second TR-069 compatible device may be identical. The first ACS and the second ACS may be identical.

The step of optimizing the home network configuration may comprise providing connectivity or better connectivity between devices in the home network.

The step of optimizing may comprise activating and repairing any local connectivity problems in the home network.

According to embodiments of the present invention the method comprises managing the configuration of at least one non-TR-069 enabled device in the home network by the home network gateway device, based on device configuration information (TR-069 enabled and/or non-TR-069 enabled), and the home network configuration information, in order to optimize the home network configuration.

According to embodiments of a second aspect of the present invention a gateway device is disclosed which is adapted for being arranged as a gateway between external networks and a home network, which is further adapted for monitoring TR-069 sessions between TR-069 enabled devices (at least a first TR-069 enabled device) in the home network and at least one external automatic configuration server (ACS).

According to embodiments of the present invention the gateway is further adapted for setting up a TR-069 session to an external automatic configuration server in order to instruct the external automatic configuration server to configure a second TR-069 enabled device in the home network. The second TR-069 enabled device can be different from or the same as the first TR-069 enabled device.

According to preferred embodiments of the present invention the gateway device is further adapted to monitor at least one non-TR-069 enabled device in the home network.

According to preferred embodiments of the present invention a gateway device is disclosed which is further adapted to configure or manage at least one non-TR-069 enabled device in the home network.

According to embodiments of a third aspect of the present invention, a network analysis module is disclosed comprising a means adapted for extracting network configuration information from the home network device or devices information.

According to preferred embodiments of the third aspect of the present invention the network analysis module further comprises a means for retrieving or determining an optimized network configuration for the home network, based on the network configuration information.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

While some embodiments described herein include some but not other features included in other embodiments, combinations of features of different embodiments are meant to be within the scope of the invention, and form different embodiments, as would be understood by the skilled person.

In a certain view, in aspects of the present invention a "snooper" or "monitoring" software is provided in the gateway for each home network. It would intercept TR-069 messages in between the devices of a home network and the ACS, snoop and keep the information needed, make sure the TR-069 session is not interrupted in between the TR-069 device and the ACS, and trigger actions to be taken on the TR-069 device via a trigger to the ACS when needed. This trigger is sent by the own TR-069 client of the respective gateway.

Figure 1:
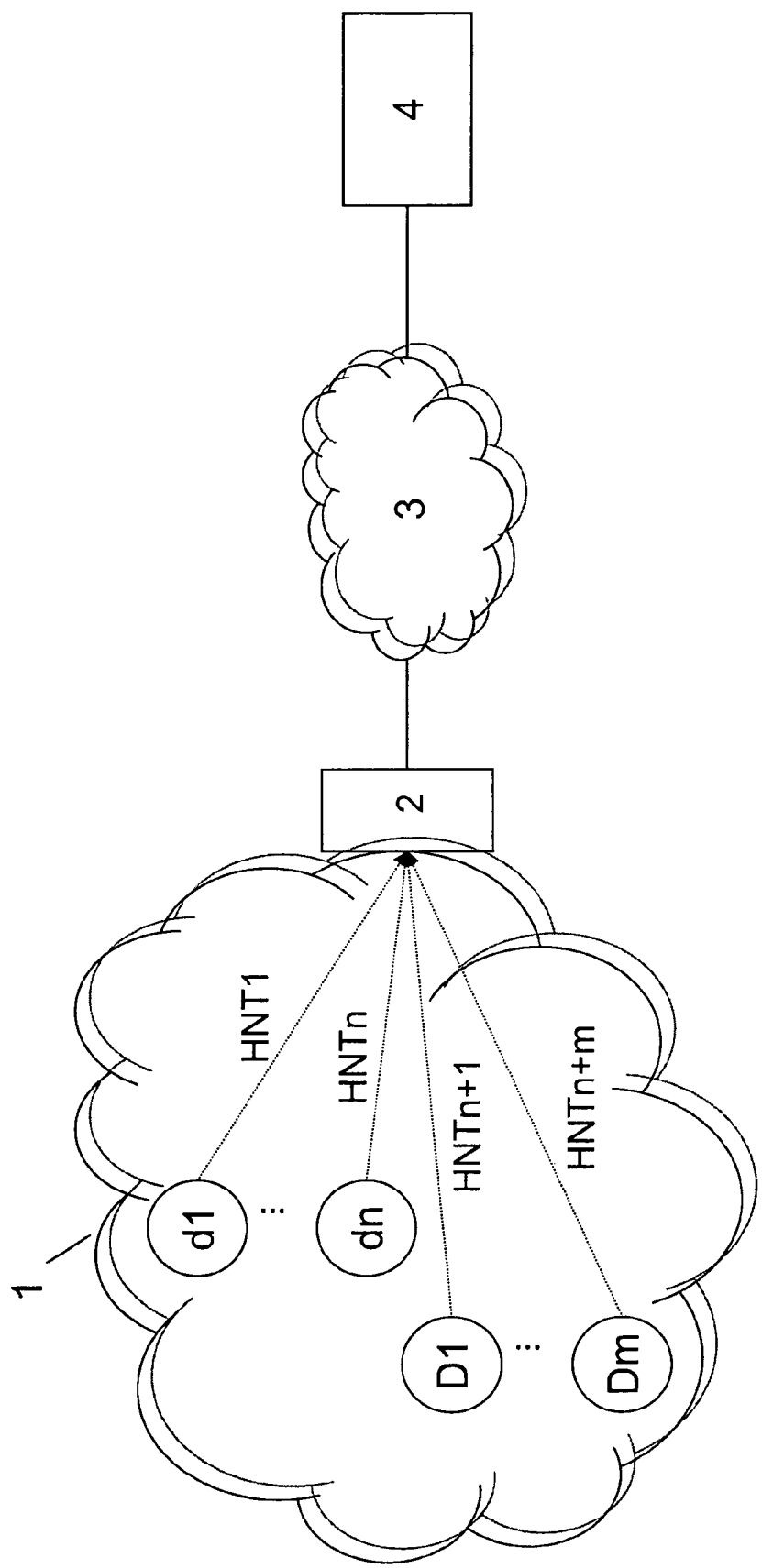
FIG. 1 illustrates a prior art solution.

In FIG. 1 a typical state of the art network architecture is depicted, in which non-remotely managed (i.e. non-TR069 devices) devices (d1, d2, . . . , dn) and remotely managed devices (D1, D2, . . . , Dm) (i.e. TR-069 devices) are present in a home network (1). The home network is connected to an external network by means of a home gateway (2). The external network may be a service providers' network. The home network may be connected to the service providers' network by means of an access network (3). An automatic configuration server (4) is preferably present in the service providers' network or external network. The home gateway may further comprise a modem (for instance a DSL, HFC, . . . modem). The modem may be connected with the home gateway. Advantageously all the TR069 traffic and optionally all HTTP traffic of the home network passes through the home gateway when forwarded towards/received from the external network. In other words, the home gateway is preferably arranged such that at least a substantial portion or all of the TR-069 traffic of the home network is passing through it while being forwarded towards/received from an external network.

The at least two types of end devices are typically present; service provider managed devices (Dx) and user managed devices (dx). The service provider managed devices are managed by means of one or more autoconfiguration servers (or services) located typically in the service providers' network. The user managed devices can be managed using dedicated software, for instance by the home gateway device. It is to be noted that the home gateway is typically an at least partially service provider managed device.

All the home network devices are interconnected and can communicate with each other using the same or different home networking technologies (HNTx). When the devices connect to the Internet or service providers' services, that traffic must pass through the home gateway (for instance over HTTP).

On the home gateway a monitoring module (21) (for instance diagnostics monitoring software) is installed, according to embodiments of the present invention. This module is preferably able to:
 manage the configuration of the non-service provider managed home network devices (dx);
 transparently (i.e. without directly interfering with) interprete and decode the management and configuration communication sessions between the service provider managed home network devices (Dx) and the auto configuration server (or services) ("snooping");
 communicate with the ACS via a management and configuration session between the auto configuration server and the home gateway (or gateway device). Because the home gateway is able to detect the configuration of most or all devices of the home network ((dx) type and (Dx) type), an up-to-date view of the network configuration can be maintained, comprising the configuration of all the devices and the way the devices are interconnected inside the home network. A goal of the monitoring module comprising the diagnostics software may be to actively detect and repair any local connectivity problem in the home network.

Figure 2:
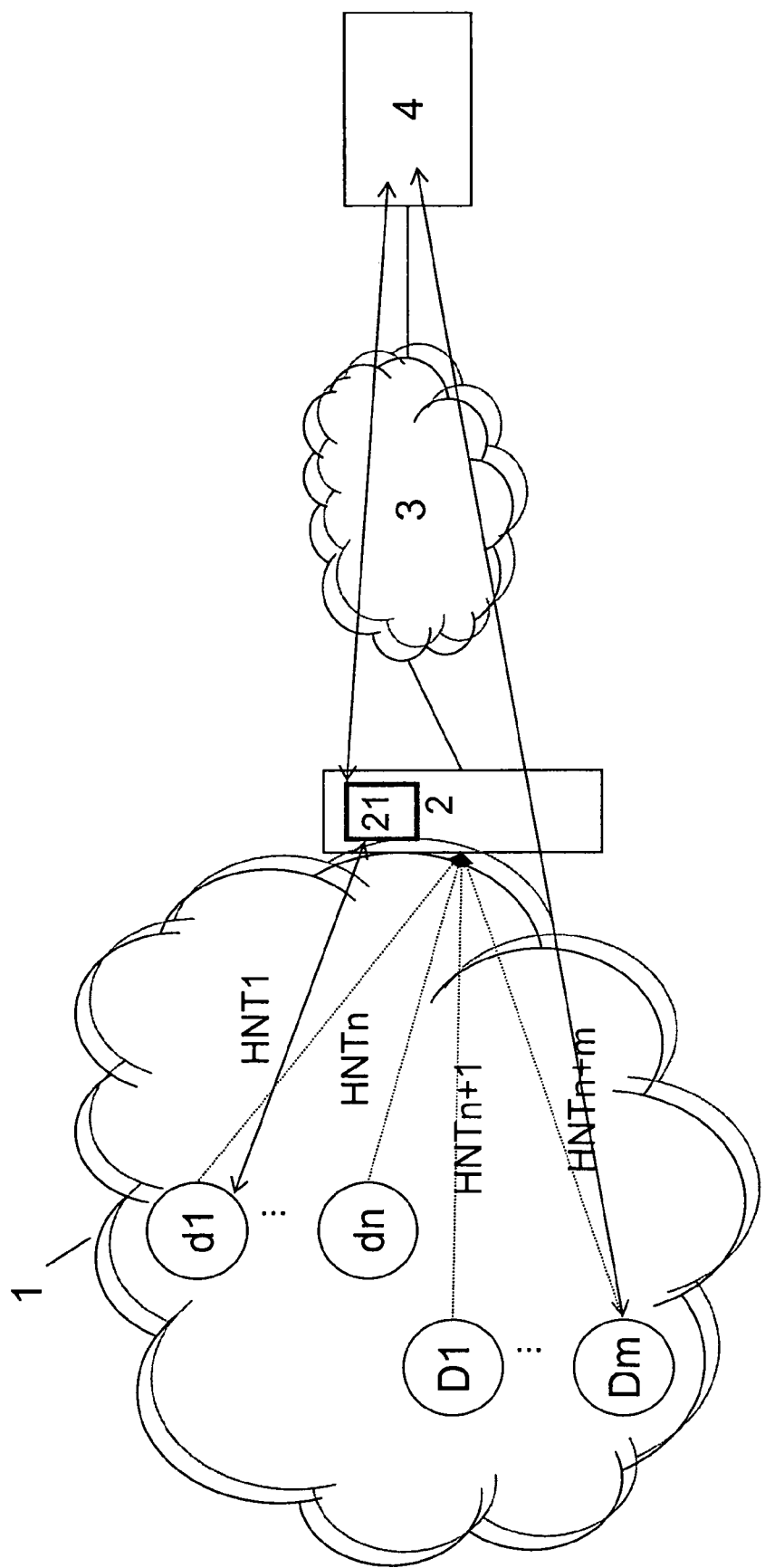
FIG. 2 illustrates embodiments of the present invention.

In FIG. 2 a possible flow according to embodiments of the present invention is further depicted. According to embodiments of the present invention the diagnostics and monitoring software on the home gateway is able to construct a coherent network configuration view of the home network. When a configuration problem arises for the non-service provider managed devices (dx) (e.g. non-TR-069 managed devices), the software program can try to repair the configuration directly, i.e. by setting up a configuration session between the home gateway (gateway device) and dx. If the problem involves changing the configuration settings of a service provider managed device Dx, the diagnostics software can set up a dedicated session between the home gateway (gateway device) and the automatic configuration server, by which the diagnostics software will indicate to the automatic configuration server which device(s) Dx which configuration settings need to be changed. Subsequently, the ACS can initiate a TR-069 session with Dx and change the respective settings.

Figure 3:
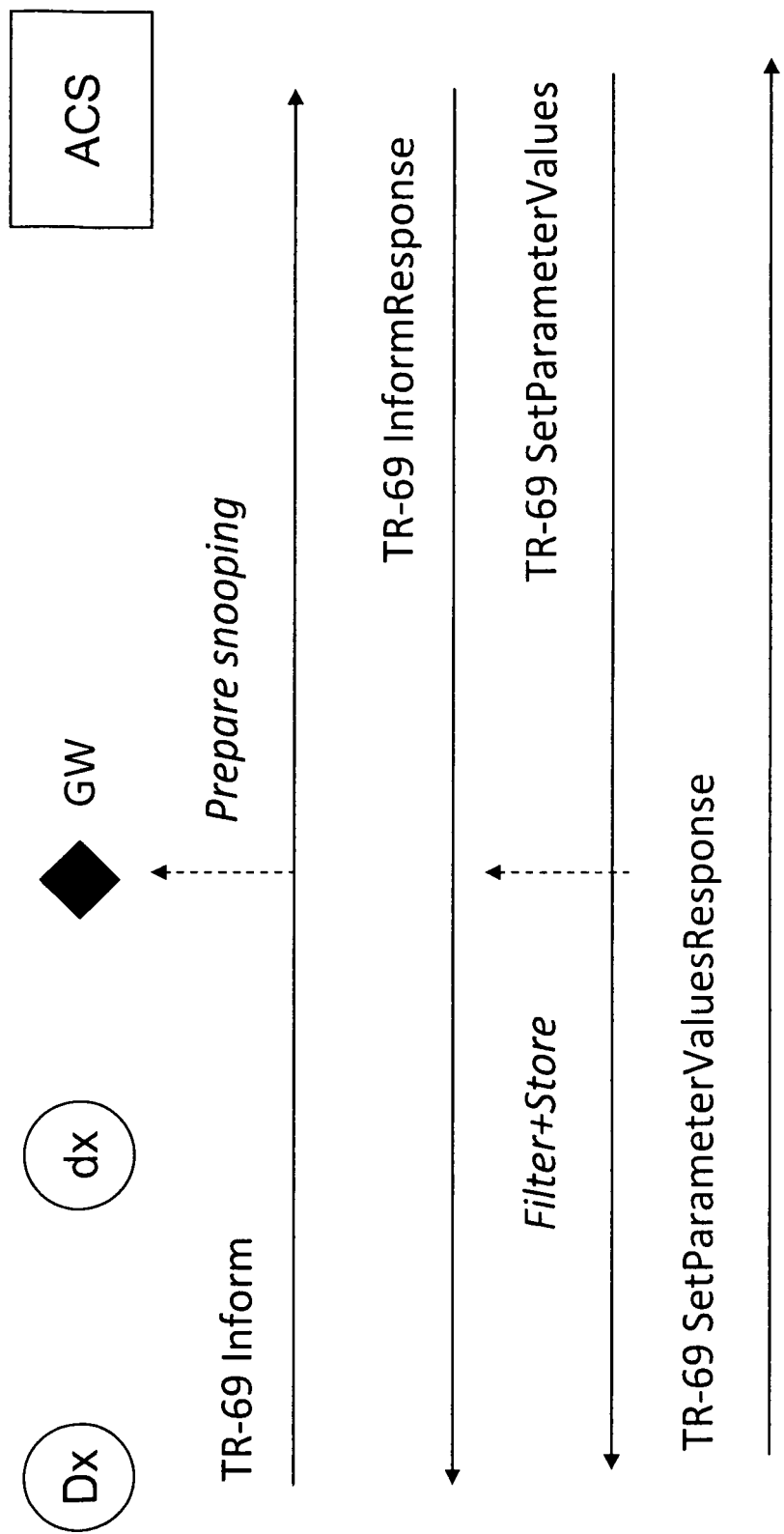
FIGS. 3 and 4 illustrate embodiments of the present invention.

In FIG. 3 a further embodiment of the present invention is depicted. In this embodiment, the diagnostics software is activated by snooping a TR-069 Inform message coming from the home device Dx, initiating a TR-069 session with the ACS. Subsequently, when the automatic configuration server decides to change the configuration settings of Dx for some reason, the diagnostics software can analyze the SetParameterValues message, filter it for diagnostics related information and store this information in a local data storage means or database on the gateway device, along with the connectivity parameters of the other home devices. For example, assuming that Dx is a WiFi access point that is installed for the first time in the home network of the user, then the Dx will issue a boots trap Inform towards its automatic configuration server in order to update its configuration settings for this new environment. The diagnostics software will then decode and store some of these parameter settings: e.g. current WiFi channel, the access control list, the quality of service (QoS), priority settings, etc.

Figure 4:
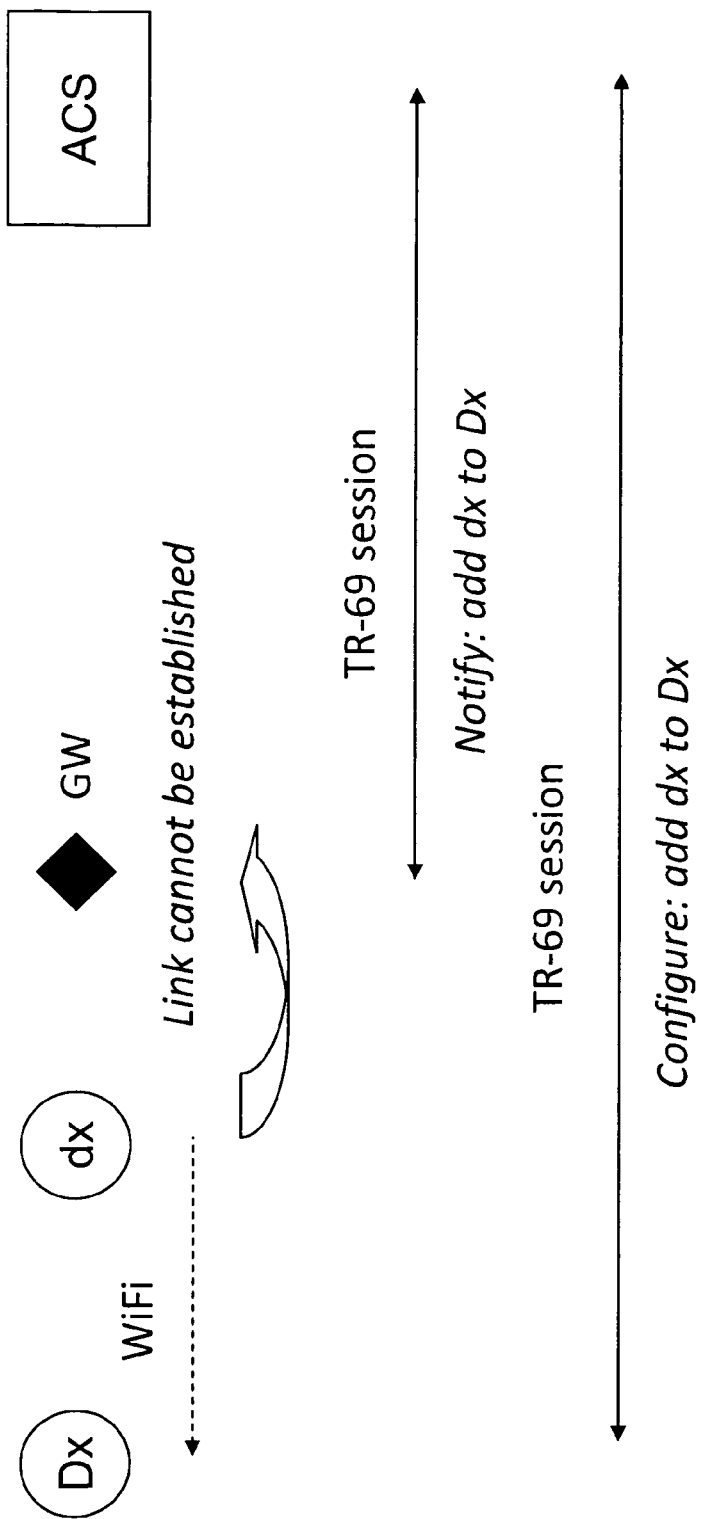

In FIG. 4 a further embodiment according to the present invention is depicted. The Dx is a WiFi access point with an access control list (ACL), i.e. only certain Medium Access Control (MAC) addresses are allowed to connect to it. dx is a WiFi client that wants to connect to Dx, but is unable to do so. The user gateway device then notifies the diagnostics software that the link cannot be established. The monitoring software knows that Dx is bound by the Medium Access Control List and dxs' MAC address is not on its Access Control List (ACL): the software has stored this information by snooping a previous configuration session between the other configuration server and Dx.

The diagnostics software can then order the gateway device to set up a TR-069 connection with the auto configuration server (TR-069 Inform) and signals that the MAC address of dx should be added to the Access Control List (ACL) of Dx. The auto configuration server requests Dx to add the MAC address of dx to the ACL list using a new TR-069 configuration session.

Some functions have been mentioned herein. They can be implemented using software, firmware (for instance fixed logic circuitry), hardware, manual processing, or any combination of these implementations. The terms "module," "component", "functionality," and "logic" as generally represent software, firmware, hardware, or any combination thereof. In software implementation cases, the module, component, functionality, or logic represents program code that performs specified tasks when executed on one or more processor(s) (for instance any of microprocessors, controllers, and the like). The program code can be stored in at least one computer readable memory device or storage means. The methods and systems are platform-independent and they may thus be implemented on different platforms.

Methods according to embodiments of the present invention may also be described in the context of computer executable instructions. Computer executable instructions can include routines, programs, objects, components, data structures, procedures, modules, functions, and the like for performing certain functions or implement certain abstract data types. The methods described herein may also be applicable in a distributed computing environment where functions are performed by remote processing devices that are linked through a communications network. In a distributed computing environment, computer executable instructions may be located in both local and remote computer storage media, including memory storage devices.

While the principles of the invention have been set out above in connection with specific embodiments, it is to be clearly understood that this description is merely made by way of example and not as a limitation of the scope of protection which is determined by the appended claims.

The invention claimed is:

1. A method for managing a home network which is connected by a home network gateway device to an external network, said home network including at least a first technical report 069 (TR-069) compatible device and said external network having at least one auto configuration server (ACS) configured to allow automatic configuration of said TR-069 compatible device, the method comprising:
monitoring TR-069 sessions between said at least one TR-069 compatible device and said at least one ACS, in said home network gateway device, the monitoring including,
interpreting and decoding said TR-069 sessions, to retrieve configuration information for said at least one TR-069 enabled device; and
setting up a TR-069 session between said home network gateway device and a second ACS in order to instruct a reconfiguration of a second TR-069 compatible device present in said home network by said second ACS, based on said second TR-069 compatible device configuration information and home network configuration information.

2. The method according to claim 1, further comprising:
providing connectivity between devices in the home network.

* * * * *